United States Patent [19]

Rennier et al.

[11] 4,155,896

[45] May 22, 1979

[54] ORGANIC COATINGS AND PAINTS HAVING UNIQUE ELECTRICAL PROPERTIES

[75] Inventors: Delmar J. Rennier, Alta Loma; Harry Z. Wilson, Santa Monica, both of Calif.

[73] Assignee: Rockwell International Corporation, El Segundo, Calif.

[21] Appl. No.: 819,438

[22] Filed: Jul. 27, 1977

[51] Int. Cl.$^2$ ............................................. C08L 83/00
[52] U.S. Cl. ................................. 260/37 M; 252/512; 252/513; 260/38; 260/39 M; 260/40 R; 260/42.22
[58] Field of Search .......................... 260/37 M, 42.22; 252/511, 512, 513

[56] References Cited

U.S. PATENT DOCUMENTS

| | | | |
|---|---|---|---|
| 3,398,233 | 8/1968 | de Lizasoain et al. | 252/512 X |
| 3,931,094 | 1/1976 | Segal et al. | 260/37 M X |
| 3,968,056 | 7/1976 | Bolon et al. | 252/512 X |
| 3,996,167 | 12/1976 | Brown | 252/512 X |

FOREIGN PATENT DOCUMENTS 2013012  3/1970  France ................................. 260/37 M Primary Examiner—Lewis T. Jacobs
Attorney, Agent, or Firm—Charles T. Silberberg

[57] ABSTRACT

Coatings with unique electrical properties, particularly for aluminum surfaces of aircraft structures, comprised of metallic fibers such as aluminum fibers, dispersed in an organic coating such as polyurethanes and epoxy primers. The metal fibers are sufficiently small in diameter and mass so as not to interfere with the required organic properties of the coating, but are of sufficient density to provide the required electrical conductivity.

18 Claims, 3 Drawing Figures

ORGANIC COATINGS AND PAINTS HAVING UNIQUE ELECTRICAL PROPERTIES

BACKGROUND OF THE INVENTION

This invention relates to coatings having unique electrical properties, and is particularly concerned with improved coatings having lightning protection and anti-static properties primarily for application to aluminum in aircraft structures, such coatings containing additives which increase the electrical conductivity of the paint to the metal, e.g. aluminum substrate.

Prior methods for dissipating electrical charges on aircraft skins, e.g. produced by lightning and particle friction which build up on painted aluminum aircraft surfaces, have not been entirely satisfactory.

Static dischargers are generally placed on commercial and military aircraft to quietly discharge the aircraft's electrical charge build-up. Although the presently employed dischargers are small, they increase drag, weight and cost of maintenance.

In addition, many aircraft incidents involving fuel tank fires and resulting in minor explosion during ground refueling or purging, have occurred. The latter incidents are attributed to electrostatic discharges within the fuel tanks.

Thus, currently employed aerospace or aircraft coatings do not provide completely effective lightning and anti-static protection on thin fuel tank skins, radomes, windshields, leading edges of aircraft, and the like.

It is one object of the present invention to provide an efficient organic coating with unique electrical properties which do not disturb the original properties of the coatings. Another object is the provision of an additive for organic paints and coatings, e.g. polyurethane or fluoroelastomer paints, which substantially increases the electrical dispersing properties of swept stroke lightning currents and substantially reduces the dielectric strength of the coating, particularly when applied to a metal or non-metal aircraft skin, to thereby rapidly dissipate such swept stroke currents or prevent build-up of electrostatic charges on the coating. A still further object is to afford an improved lightning protection and anti-static organic paint or coating having the above desirable characteristics, and including increased electrical conductivity, erosion and abrasion resistance and strength, without interfering with or reducing the desired favorable protective properties of the organic coating.

SUMMARY OF THE INVENTION

It has been found according to the invention that the above objectives can be achieved with an effective organic coating by dispersing metallic fibers or filaments, e.g. aluminum fibers, into these coatings or paints such as polyurethane or fluroelastomer paints. The term "metallic fibers" is meant to denote metal fibers or metal coated or metal plated fibers, as described in greater detail hereinafter.

Thus, anti-static coatings have been developed according to the invention, as an alternative to the use of static dischargers on aircraft. Such coatings can be used either to discharge directly to the air, or alternatively, such coatings can be applied over and conduct through graphite-filled coatings.

The fibers or filaments can be randomly oriented in the coating composition or the fibers can be oriented vertically to the surface finish. Across coating thicknesses, the continuous metal fibers are very low in resistance in comparison to the contact resistance between fibers and substrate or between the fibers themselves. By employing fibers of sufficiently small diameter and of lengths sufficient to bridge the coating thickness and to form fiber-to-fiber links, the contact resistance between the external surface and the metal substrate is reduced. The use of small diameter metallic fibers has the effect of producing multiple highly conductive paths through the coating, using a minimum amount of fiber mass and volume. The result is a semi-conductive coating of reduced dielectric strength which dissipates swept stroke currents and electrostatic charges by providing multiple dispersion paths for the current through the coating or multiple sharp discharge points.

The fibers are of sufficiently small diameter and mass as not to interfere with the usual required physical properties of the coating such as its smoothness, covering ability, gloss and corrosion protection, but are of sufficient density and loading in the coating to provide the electrical conductivity, and improved erosion, abrasion impact resistance, and strength.

In order to achieve the above noted results, the metal fibers should be of suitably small diameter as disclosed hereinafter. Also, it is preferred that the fibers have a length, and a length to diameter ratio, as pointed out in greater detail below, and that the quantity of fibers or fiber loading of the coating composition or paint be within the range pointed out below.

The metallic fiber loaded coating composition can be applied to metal, e.g. aluminum, or to non-metallic substrates such as polyimide quartz and graphite-epoxy composites and fiberglass. When applied to the aluminum surface of aircraft components, usually the aluminum surface is initially anodized, and a primer coat is first applied, followed by one or two topcoats of paint, such as polyurethane paint. According to the present invention, the metallic fibers can be mixed into the primer, if desired, and also into one or both of the topcoats before applying them to the aluminum surface. This induces lightning swept strokes to scatter over a wide area on the coated surface, thus preventing concentration of the lightning current and subsequent skin puncture. Coatings with specially applied and oriented fibers reduce the static charge build-up on the coatings.

Briefly then, the invention provides a lightning protection or anti-static coating composition or paint, with unique electrical properties, comprising an organic coating material or vehicle having dispersed therein metallic fibers or filaments of sufficiently small diameter and mass as not to adversely affect the properties of the coating material, but being present in an amount or density such as to substantially increase the electrical conductivity and the electrical dispersion properties of the coating material, or substantially reduce the dielectric strength thereof when applied to a substrate.

The resulting metal fiber loaded coating composition or paint provides lightning protection for thin fuel tank skins, windshields and canopies, and anti-static protection for radomes and internal fuel tank surfaces of aircraft, improved erosion-abrasion resistance, improved impact attenuation, improved adherence of coatings to substrates, and improved strength and crack resistance.

DETAILED DESCRIPTION OF THE INVENTION AND PREFERRED EMBODIMENTS

Figure 1:
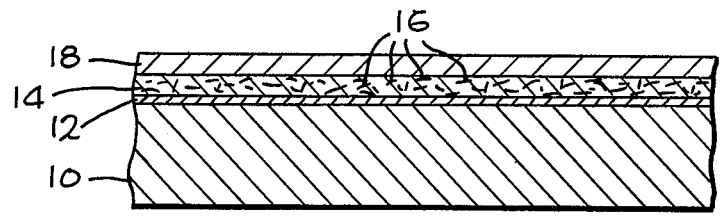

Examples of conductive or metallic fibers which can be incorporated into the organic paint or coating to confer the desired electrical properties on the coating, include aluminum and aluminum alloys, nickel, steel, and plated metals such as tin plated steel and copper plated steel. Non-metallic fibers containing a continuous metallic coating can also be employed, such as nickel plated glass fibers or copper plated glass fibers, usually in the form of electroless nickel or electroless copper plated glass fibers. All of these types of conductive fibers are intended to be encompassed by the term "metallic fibers" employed herein. The preferred metallic fibers are aluminum or aluminum alloy such as 6061. Aluminum fibers have corrosion resistance and are galvanically similar to aluminum substrates; thus, they meet corrosion protection requirements, particularly for aircraft use. Accordingly, the conductive or metallic fibers should be galvanically compatible with the composition of the substrate.

The diameter of the conductive or metallic fibers preferably is small so as to avoid interference with the physical properties of the organic coating such as its surface smoothness. Thus, the diameter of the fibers can range from about 0.00001" to about 0.002", preferably from about 0.00002" to about 0.001". Most desirably, the diameter of the fibers is not in excess of about 1 micron (0.00004"), e.g. 0.5 to 0.8 micron.

The length of the conductive or metallic fibers does not necessarily need to be less than the thickness of the organic coating when applied to the substrate and they may protrude through the surface of the coating, especially when the fibers are intentionally oriented vertically. Fiber lengths can range, for example, from about 0.002" to about 0.02", e.g. about 0.006". As the diameter of the fiber is reduced, the length of the fiber is also generally reduced.

The length to diameter ratio of the metallic fibers can range, for example, from about 10 to about 500, such ratio preferably being at least 15.

The conductive paint or coating in which the metallic fibers are dispersed can be of any organic coating composition. Particularly preferred compositions are the commercially available polyurethane coating compositions, which can be polyether or polyester based polyurethanes. These compositions are particularly effective as coatings on aircraft components. Another example of a suitable coating composition are the commercially available epoxy polymers or resins, e.g. the condensation product of bisphenol A and epichlorhydrin. Other coating compositions which can be employed include vinyl resins or polymers, acrylic resins, such as acrylonitrile polymer, vinyls such as vinyl chloride polymers, vinyl-acrylic copolymers, butadiene copolymers and homopolymers such as butadieme-styrene, silicone resins such as dimethyl polysiloxanes, melamine resins including melamine-formaldehyde, phenolic resins including phenol-formaldehyde, urea-formaldehyde, fluoroelastomers, and the like.

The above organic coating compositions are often available in liquid form, and can also contain solvents or thinners such as a ketone, e.g. methyl isobutyl ketone (mibk), methyl ethyl ketone (mek), actone, or aromatic solvents such as toluene or xylene. Additional thinner can be added to provide suitable viscosity, e.g. for spraying, as is well known in the art. However, some resin or coating systems such as an epoxy system containing metallic fibers according to the invention, can be sprayed without any thinner. Where a thinner is employed, the amount of thinner used can range from about 70 to about 500 parts, per 100 parts of resin solids, by volume.

In compounding the coating composition or paint according to the invention, the metallic fibers, e.g. aluminum fibers, are mixed and incorporated in suitable proportions with the liquid resin base component noted above, e.g. polyurethane or epoxy, generally containing suitable solvent as noted above. The amount or loading of the metallic fibers in the coating composition ranges from about 0.001 to about 2 parts of the fibers, per 60 parts of resin solids, by weight. Where required, a suitable curing agent for the resin component is preferably incorporated into the coating composition at or about the time of application of the coating composition to the substrate. The curing agents employed generally are those which effect a cure at room temperature. In the case of epoxy resins, suitable curing agents include polyamines such as p-phemylene diamine or polyamides such as the material marketed as Versamid. In the case of silicone resins there can be employed curing agents such as benzoyl peroxide.

The organic coating composition or paint of the invention can be coated on the substrate, e.g. aluminum components of aircraft, by brushing, doctor blade or by spraying, and the coating permitted to dry and harden or cure, generally at ambient temperature.

Any suitable substrate or surface can be coated with the coating composition of the invention, including metallic and non-metallic substrates. Examples of metal substrates include particularly aluminum and titanium aircraft components, such as fuel tanks, leading edges, and any thin aluminum skin, particularly where it is desirable to prevent lightning puncture. Examples of non-metallic substrates include glass, plastics, fiberglass, advanced composites such as graphite-epoxy and polyimide quartz, and rubber, e.g. windshields and radomes of aircraft, to provide anti-static protection for these components.

The thickness of such coatings can range from about 0.0005 to about 0.025", e.g. about 0.003". Where the coating composition is used as a primer coat it is usually thinner, e.g. about 0.0005" to about 0.005". Multiple coats are often applied, such as an initial primer coat, e.g. an epoxy coating composition which may or may not contain metallic fibers according to the invention, and one or two top coats of polyurethane composition, one or both of which can contain metallic fibers. The total thickness of such multiple coats can range from about 0.001" to about 0.030", usually about 0.002" to about 0.015".

When the coating composition or paint is applied to the substrate, if it is desired to orient the fibers vertically or perpendicular to the coating surface, this can be accomplished by subjecting the coating to a high electric potential field before the coating dries or cures, by placing the painted surface between two parallel plate electrodes and applying a high voltage (approx. 6KV) between the plates.

Figure 2:
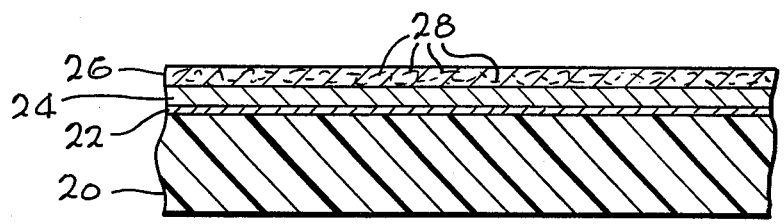
Figure 3:
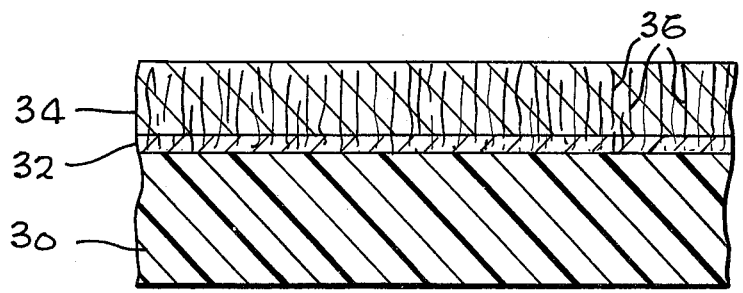

The following are examples of practice of the invention, taken in connection with the accompanying drawing wherein FIGS. 1 to 3 illustrate various coating systems on fiberglass and aluminum substrates, according to the invention.

EXAMPLE 1

An aluminum test panel having a thickness of 0.040" was first sulfuric acid anodized and an epoxy primer was sprayed on its surface and allowed to cure.

Next, a first top coat of polyurethane paint containing 0.5 gm of aluminum fibers (0.8 micron diameter and 0.002" long) per 300 ml of liquid paint, was sprayed on the primer coat.

After the first top coat dried, a second top coat of the same polyurethane coating composition but containing no aluminum fibers was sprayed onto the first top coat and dried.

The above coating system increases the electrical conductivity of the coating or paint to the aluminum substrate, and has substantially reduced dielectric strength, thereby inducing any lightning strike to scatter over a wide area on the paint surface, thus preventing concentration of the lightning current and preventing subsequent skin puncture of the 0.040" thick aluminum.

FIG. 1 illustrates the above coating system, numeral 10 being the aluminum substrate, 12 the epoxy primer coat, 14 the first polyurethane top coat containing random aluminum fibers 16, and 18 the second polyurethane top coat containing no fibers.

Various combinations of fiber loading can be used in which the aluminum fibers are loaded only in primer; first topcoat, second topcoat; primer and first topcoat; primer and second topcoat; and primer, first and second topcoat.

EXAMPLE 2

Aluminum fibers of 3 micron diameter and approximately 0.005" in length were added to and mixed with a standard De Soto Fuel Tank Polyurethane Coating Base Resin Catalyst and Thinnner. The polyurethane composition contained about 20% by weight of resin solids. About 0.009 gm of aluminum fibers were added per 300 ml of the above polyurethane coating composition.

The resulting polyurethane composition was tested for use as an aircraft fuel tank coating by applying it to a thin 6" × 6" aluminum panel which had been chromate conversion coated (chemical filmed). Two coats of the above polyurethane coating composition containing the metal fibers were sprayed on the chemical filmed surface. The first coat was allowed to dry before the second coat was applied. Total thickness of the two coats on the panel was about 0.002".

In both coats the fibers were oriented vertically using 7KV DC applied between parallel metal plate electrodes about ⅜" apart. The equipment designated as "Hipotronics 300 Series Hipot and Megohmeter" was used to apply voltage within two minutes after spraying each coat.

A second control panel B was provided which was substantially the same as panel A above. The chemical filmed surface thereof was coated with the polyurethane coating composition described above but contained no aluminum fibers. Two separate coats of such composition were sprayed onto the chemical filmed sample surface, to a total thickness about equal to that on panel A.

The DC values for dielectric strengths of the coatings were determined using the above mentioned Hipot and Megohmeter and results are set forth in Table 1 below:

TABLE 1

| PANEL A (Fiber Loaded) Dielectric Strengths, KV DC | | | | | PANEL B (Control Panel, Without Fibers) Dielectric Strengths KV DC | | | | |
|---|---|---|---|---|---|---|---|---|---|
| 0.31, | 0.26, | 0.30, | 0.24, | 0.23 | 2.7, | 2.5, | 2.3, | 2.5, | 2.4 |

The above table shows that the coatings on the test panel containing aluminum fibers according to the invention, had substantially reduced dielectric strength as compared to the coating of control sample B containing no aluminum fibers.

The coating on panel A is applicable as an anti-static fuel tank coating on the interior surfaces of aluminum fuel tanks for aircraft; to prevent electrostatic discharges within the fuel tanks.

EXAMPLE 3

Aluminum fibers of 0.8 micron diameter and approximately 0.006" in length were added to a white polyurethane coating composition: comprised of two proprietary components, namely, Component I, Pigmented Base coating Polyurethane Aliphatic Color 17875 Gloss White; Component II, Aliphatic Isocyanate Reactant, Coating Polyurethane Aliphatic; Deft Chemical Coatings Division, Deft Inc. Three different white polyurethane coating compositions containing fibers were compounded from this polyurethane paint, namely compositions I, II, and III containing differing amounts of fibers, composition I containing 0.009 gms, composition II 0.106 gms, and composition III 0.377 gms, each based on 300 ml of the above polyurethane coating composition or paint.

Three test aircraft fiberglass radome panels F, G, and H were first treated with an epoxy primer undercoat by spraying with an epoxy primer composition containing approximately equal volumes of liquid epoxy resin, Bostik-Finch Primer Epoxy Polyamide; thinner-Desoto Super Koropon and polyamide catalyst or curing agent marketed as Bostik-Finch Polyamide Converter.

An initial or first topcoat of the above white polyurethane coating composition containing no aluminum fibers was applied by spraying to each of the epoxy primed panels, and following drying of the first top coat, a second top coat of compositions I, II and III above, containing aluminum fibers, was sprayed onto the first polyurethane top coat on each of panels F, G, and H respectively. The initial or first white polyurethane top coat on each of the above panels was about 0.001" thick and the thickness of the second white polyurethane top coat on each of the panels was about 0.0007".

FIG. 2 of the drawing illustrates the above coating systems on each of panels F, G and H. Numeral 20 represents the radome substrate, 22 is the epoxy primer coat, 24 is the first white polyurethane top coat containing no fibers and 26 is the second white polyurethane topcoat containing aluminum fibers 28.

A fourth radome test panel I of the same composition as the above panels F, G and H was coated with the same coating system as panel F, but with no aluminum fibers in the second white polyurethane top coat, so that both the first and second polyurethane top coats on panel I contained no aluminum fibers. This coated panel functioned as a control test panel.

Each of the panels F, G, H and I was then subjected to a radiating frequency of 9 GHz for the purpose of measuring degradation of radar transmitting qualities. The results of these tests are shown in Table 2 below:

TABLE 2

| Test Panel | Loading of Al fibers in 2nd top coat gms/300ml | Measured Loss at 9 GHz, % |
|---|---|---|
| F | 0.009 | $\leq 3$ |
| G | 0.106 | $\leq 3$ |
| H | 0.377 | 8 |
| I (Control) | 0 | 0 |

From the above Table 2, it is seen that panels F and G indicated relatively little degradation in radar transmitting quality, which was within the limits of error of the equipment used, and panel H showed only very moderate degradation, due to the presence of the aluminum fibers in the coatings on these panels.

EXAMPLE 4

A 21" by 24" fiberglass radome panel was first sprayed with epoxy primer and allowed to cure.

Aluminum fibers of 0.8 micron diameter and approximately 0.002" in length were then added to a white polyurethane paint, with a loading consistancy of 0.009 gm per 300 ml, and sprayed on the primer. Before drying, these fibers were oriented vertically, by placing the panel between two paralled plate electrodes and applying a potential of 2.5KV DC between the electrodes. This represented the first top coat.

A second top coat, identical to the first top coat, was applied in the same manner.

The coated surface on the panel was then subjected to a static electric charging by blowing the material marketed as "Wonder Flour" out of an air gun at 100 psi.

It was found that the aluminum fibers reduced the standing charge from 65 KV to 40 KV when compared to a painted panel without fibers. This effect amounts to a corresponding reduction of electromagnetic interference that is induced into sensitive aircraft electronic equipments.

EXAMPLE 5

The procedure of Example 3, panel F, is followed for applying a coating system to a radome test panel; except that in this example, the first top coat is a black anti-static fluoroelastomer paint (AF-C-935) applied at a thickness of 0.0025" and containing aluminum fibers which are approximately 0.014" long. The fibers extend vertically through the second top coat. The second top coat is a white fluoroelastomer paint (AF-C-VBW-15-15) applied at a thickness of 0.011".

This coating system is shown in FIG. 3 of the drawing wherein 30 is the radome panel, 32 is the first black fluoroelastomer top coat containing the vertically oriented aluminum fibers, 34 is the white fluoroelastomer second top coat, and 36 is the vertically oriented fibers.

EXAMPLE 6

The procedure of Example 1 was followed for coating a similar aluminum test panel except that in place of aluminum fibers, tin plated steel fibers were incorporated into the primer and the first polyurethane top coating, the latter fibers having substantially the same diameter and length, and employed in the same amount, as the aluminum fibers in Example 1.

The resulting coating system also increased the electrical conductivity of the coating to the aluminum substrate and also had substantially reduced dielectric strength, as compared to the corresponding system without fibers, and provided lightning protection for thin aluminum skins (0.040" thick).

From the foregoing, it is seen that the present invention provides an improved aircraft lightning protection composition or paint, and coating system on a substrate, in the form of an organic, e.g. primer and polyurethane, coating containing as additive, metallic fibers. Such coating compositions and coating systems can be applied, for example, to aircraft wing tips, aircraft fuselage and external wing tanks, and any thin metal, e.g. aluminum, skin, to prevent lightning puncture. Thus, the coating compositions and systems of this invention can provide direct and/or swept stroke lightning protection, as well as anti-static protection for thin fuel tank skins, radomes and windshields. The incorporation of such fiber additives does not interfere with the physical properties of the coating or paint such as its rain, erosion and abrasion resistance, and the resulting coating composition can be easily applied to substrates to provide a desirable and smooth appearance.

Although the lightning protection and anti-static coating and paint compositions and coating systems of the invention are particularly valuable for use on aircraft components, it will be understood that such coatings and paints can be applied to any metallic or non-metallic substrate where lightning or anti-static protection is desired.

It is understood that various changes and modifications can be made in the invention coating composition and system without departing from the spirit of the invention, and the invention accordingly is not to be taken as limited except by the scope of the appended claims.

What is claimed is:

1. A lightning protection or anti-static coating composition comprising an organic coating material having dispersed therein metallic fibers, said fibers being of sufficiently small diameter and mass as not to adversely affect the properties of said coating material, but being present in an amount such as to substantially increase the electrical conductivity and the electrical dispersion properties of the coating material, or substantially reduce the dielectric strength thereof when applied to a substrate, the diameter of said fibers ranging from about 0.00001" to about 0.002".

2. The coating composition as defined in claim 1, the length of said fibers ranging from about 0.002" to about 0.02", the length to diameter ratio of said fibers ranging from about 10 to about 500.

3. The coating composition as defined in claim 1, said fibers being present in an amount ranging from about 0.001 to about 2 parts, per 60 parts of resin solids, by weight.

4. The coating composition as defined in claim 2, said fibers being present in an amount ranging from about 0.001 to about 2 parts, per 60 parts of resin solids, by weight.

5. The coating composition as defined in claim 1, said fibers being metal fibers, plated metal fibers or metal coated non-metallic fibers.

6. The coating composition as defined in claim 1, said fibers being selected from the group consisting of aluminum and aluminum alloys, nickel, steel, tin plated steel, copper plated steel, nickel plated glass fibers and copper plated glass fibers.

7. The coating composition as defined in claim 4, said fibers being metal fibers, plated metal fibers or metal coated non-metallic fibers.

8. The coating composition as defined in claim 1, said organic coating material including a polymer selected from the group consisting of polyurethane, epoxy, vinyl, and acrylic polymers, vinyl-acrylic copolymers, fluoroelastomers, butadiene copolymers and homopolymers, silicone, melamine and phenolic resins.

9. The coating composition as defined in claim 8, the length of said fibers ranging from about 0.002" to about 0.02", and the length to diameter ratio of said fibers ranging from about 10 to about 500.

10. The coating composition as defined in claim 9, said fibers being metal fibers, plated metal fibers or metal coated non-metallic fibers.

11. The coating composition as defined in claim 9, said fibers being selected from the group consisting of aluminum, and aluminum alloys, nickel, steel, tin plated steel, copper plated steel, nickel plated glass fibers and copper plated glass fibers.

12. The coating composition as defined in claim 1, said fibers being metal fibers, plated metal fibers or metal coated non-metallic fibers.

13. A lightning protection or anti-static coating composition comprising an organic coating material having dispersed therein metallic fibers, said fibers being of sufficiently small diameter and mass as not to adversely affect the properties of said coating material, but being present in an amount such as to substantially increase the electrical conductivity and the electrical dispersion properties of the coating material, or substantially reduce the dielectric strength thereof when applied to a substrate, the length of said fibers ranging from about 0.002" to about 0.02".

14. The coating composition as defined in claim 13, the length to diameter ratio of said fibers ranging from about 10 to about 500.

15. The coating composition as defined claim 14, said fibers being present in an amount ranging from about 0.001 to about 2 parts, per 60 parts of resin solids, by weight.

16. The coating composition as defined in claim 13, said fibers being metal fibers, plated metal fibers or metal coated non-metallic fibers.

17. The coating composition as defined in claim 15, said fibers being selected from the group consisting of aluminum and aluminum alloys, nickel, steel, tin plated steel, copper plated steel, nickel plated glass fibers and copper plated glass fibers.

18. The coating composition as defined in claim 17, said organic coating material including a polymer selected from the group consisting of polyurethane, epoxy, vinyl, and acrylic polymers, vinyl-acrylic copolymers, fluoroelastomers, butadiene copolymers and homopolymers, silicone, melamine and phenolic resins.

* * * * *